(12) United States Patent
Kemmler et al.

(10) Patent No.: US 9,002,901 B2
(45) Date of Patent: Apr. 7, 2015

(54) OPTIMIZED DATABASE CONTENT PROVISIONING

(75) Inventors: Andreas Kemmler, Bonigheim (DE); Torsten Kamenz, Wiesloch (DE)

(73) Assignee: SAP SE, Walldorf (DE)

( * ) Notice: Subject to any disclaimer, the term of this patent is extended or adjusted under 35 U.S.C. 154(b) by 44 days.

(21) Appl. No.: 13/561,466

(22) Filed: Jul. 30, 2012

(65) Prior Publication Data

US 2014/0032610 A1 Jan. 30, 2014

(51) Int. Cl.
*G06F 7/00* (2006.01)
*G06F 17/30* (2006.01)

(52) U.S. Cl.
CPC ................ *G06F 17/30297* (2013.01)

(58) Field of Classification Search
None
See application file for complete search history.

(56) References Cited

U.S. PATENT DOCUMENTS 7,280,529 B1 * 10/2007 Black et al. ............ 370/352
2011/0252100 A1 * 10/2011 Raciborski et al. ........ 709/206

OTHER PUBLICATIONS

Gerco Ballintijn "A Case Study of the Release Management of a Health-care Information System", ICSM (Industrial and Tool Volume), 2005, 10 pages.*

* cited by examiner

*Primary Examiner* — Uyen Le
(74) *Attorney, Agent, or Firm* — Fountainhead Law Group P.C.

(57) ABSTRACT

Database content provisioning includes a broad base shipment as an initial release of database content. The database content may then be incrementally enriched with specific enhancements, which may be delivered as updates. Shipping variants for delivering upgrades include delta installations, and in some embodiments, may include full installations. Changes to an existing database object in activated database content may be treated as a new database object, and may include a reference to the existing database object. The user is notified of the new database object, but the new database object is otherwise not activated, thus ensuring stability of the activated database content.

16 Claims, 6 Drawing Sheets

OPTIMIZED DATABASE CONTENT PROVISIONING

BACKGROUND

Unless otherwise indicated herein, the approaches described in this section are not prior art to the claims in this application and are not admitted to be prior art by inclusion in this section.

The delivery of a database system may include providing continuing support to the customer to facilitate extracting the maximum use of their data. Database system support typically includes delivering data models and other database content to the customer. Because the customer's data is dynamic, database content may require frequent updates in order to keep up with changing requirements for how the data is used.

The provisioning of database content should be stable and sustainable, in order to minimize disruptions to the customer's operations. Database content should be deliverable in a continuous manner, with little adjustment effort in order to keep the customer's total cost of ownership of the database system and their content as low as possible.

DETAILED DESCRIPTION

Disclosed embodiments relate to the distribution of database content. In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

Figure 1:
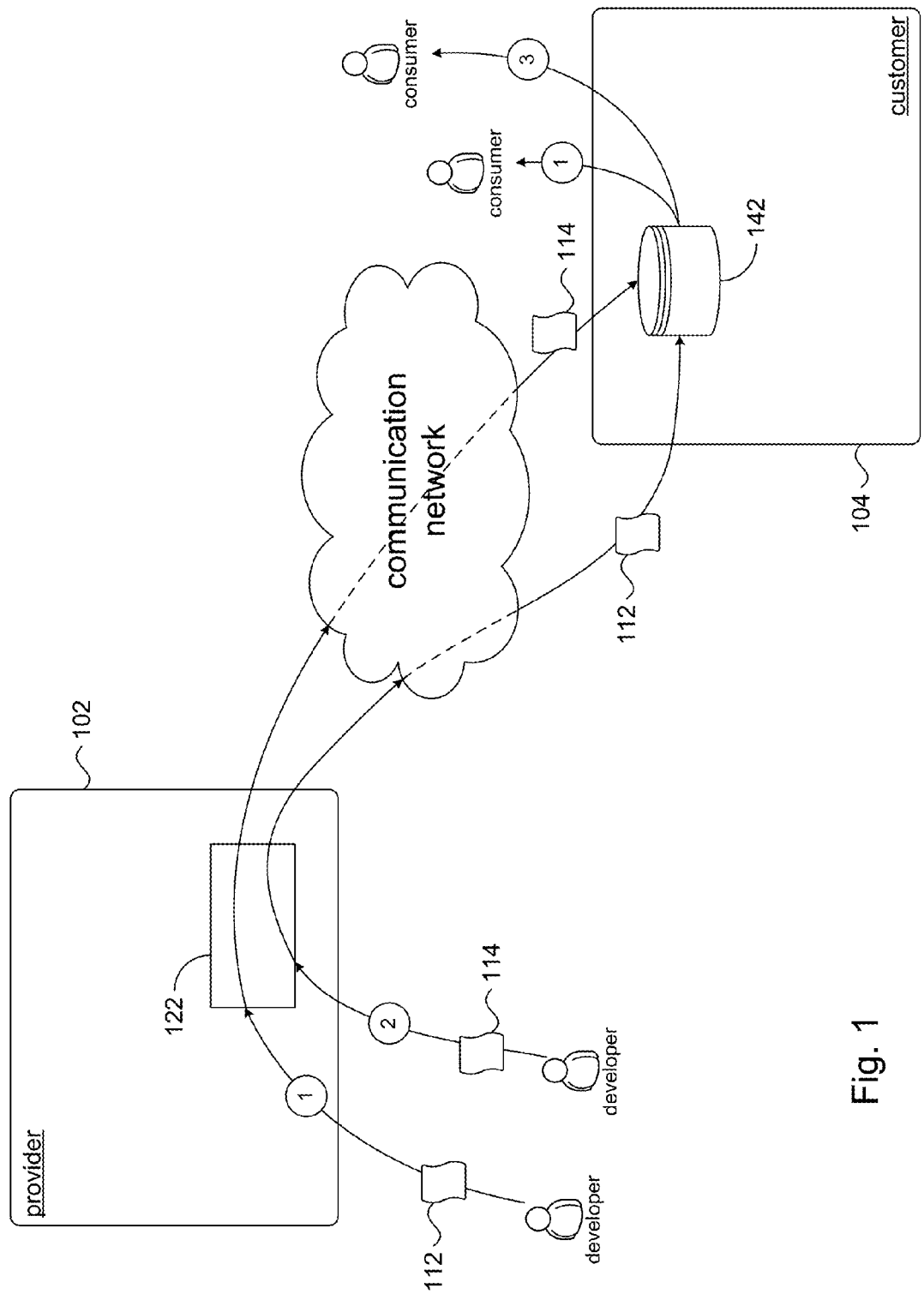
FIG. 1 illustrates a provider and customer configuration in accordance with the present disclosure.

FIG. 1 shows an illustrative configuration, in accordance with the present disclosure, for managing the development of database content by a provider system 102, and the provisioning of database content to a customer system 104. The provider system 102 may provide database support to a customer in terms of data modeling and other database support services for a data system 142 at the customer system 104. For example, SAP, Inc. develops and sells the SAP HANA® database product, and provides support services to its customers such as data modeling of their business data. The database content that is delivered to the customer system 104 may be a database model. For example, SAP, Inc. develops and provides database content called Application Views which are data models that can be delivered to the customer as HANA Content Packages. The term "database content" will be understood to refer generally to data objects and any information relating to data modeling and data support content that may be provided by the provider system 102. Database content may be delivered in a unit called a "database content package." The terms "database content" and "database content package" may be used interchangeably.

The provider system 102 may include a release manager 122 to manage their releases of database content 112, 114. In some embodiments, for example, developers in the provider system 102 may develop an initial release of database content that is released to customers via the release manager 122; this is illustrated as database content package 112 in flow 1 shown in FIG. 1. Developers may subsequently want, or need, to introduce revised database content, which can be managed through the release manager 122 and delivered via flow 2 as one or more database content packages 114. Database content 112, 114 may be delivered to the customer system 104 (e.g., over a suitable communication network) and installed in their data system 142, allowing consumers in the customer system to use the database content.

In some embodiments, the release manager 122 may manage the delivery of database content 112, 114 to many customers. The release manager 122 may operate with some guiding principles in accordance with the present disclosure, including:

support for multiple versions of data being modeled—For example, customers' data systems may include a particular enterprise resource planning (ERP) system. Different customers may have different versions of the ERP system, or the same customer may upgrade to a new version of its ERP system. Accordingly, data stored in different ERP systems may need to be modeled differently.

delivery of database content may be an ongoing process— It may not be practical (and in some cases not possible) to deliver an entire database content package to the customer 104, because doing so could be too disruptive to the customer or it may prevent timely shipment of updates, new features, etc. Rather, the customer 104 may prefer incremental delivery of database content. Also, incremental updates allow the developer to focus on important features, respond to specific customer requests, etc., and attend to lower priority matters at a later time.

provide corrections and ship patches/support packages— The delivery of database content may be used to correct or patch problems in previously delivered database content.

multiple development fronts after initial release—The delivery of subsequent releases of database content after an initial release may branch into multiple development paths in order to support differing needs of different customers, corrections, and so on. For example, following a release of an initial version of a data model, different customizations of the data model may be requested from different customers to suit their individual needs.

In accordance with the present disclosure, the delivery of database content centers around an initial broad based shipment which will be referred to herein as the "initial release" of database content. The initial release of database content can then be optionally and incrementally enriched with subsequent updates to the initial release database content. Such updates will be referred to herein as "updated" database content. The delivery of updated database content can therefore be optimized for the initial release of the database content and for subsequent updates to the database content In some embodiments, shipments of updated database content may happen on a fixed regular schedule; e.g., a quarterly schedule, a bi-monthly schedule, etc. In other embodiments, shipments of updated database content may be completely flexible so that deliveries can be made whenever new content is made available, urgent changes are needed, and so on.

Updates to database content may contain only the changes ("delta") to a previous update. In accordance with principles of the present disclosure, any substantive change to a data object may be treated as a "new data object". For example, an existing data object that has been modified will result in creation of a new version of the existing data object. A newly created data object, of course, is a new data object and constitutes the initial version of the newly created data object. In accordance with the present disclosure, the following variants of updates may be recognized:

Full installation—All the constituent data objects of a given release of database content are included.

Delta installation—Only those data objects which have changed or were newly created since a certain date are part of the delivery.

Typically, delta installations are delivered. However, there may be situations where a full installation for a current release of a given database content package is preferred. For example, a new customer may want to receive a full installation rather than installing an initial release of the database content and then performing several incremental updates from the initial release to obtain the most current installation.

In accordance with the present disclosure, a customer's "activated" database content will not be automatically updated when updated database content is delivered and installed in the customer system 104. For example, suppose a sales team is relying on a data view "ViewOnTotalSales" from previously installed and activated database content to make their decisions. Activation of updated database content may result in replacing the old "ViewOnTotalSales" with a new "ViewOnTotalSales". If the activation is unplanned or otherwise unexpected, a user who accesses "ViewOnTotalSales" may not realize they are accessing the new version, and may make potentially incorrect decisions because they thought they were viewing the old version. Accordingly, an authorized user may be required make a deliberate and informed decision to allow the update(s) to be activated on their live system to ensure against such potential disruptions. This notion of "activation" will be discussed in more detail below.

Database content is typically designed to work in conjunction with some business application running on the customer system 104. For example, a database model may be designed to work with the customer's ERP system. In accordance with the present disclosure, releases of database content may be designed for one version of the corresponding business application on the customer system 104. The database content may continue to work for subsequent versions of the corresponding business application, but may not otherwise be backward compatible with earlier versions of the corresponding business application. For example, database content designed for version 2.0 of a business application may not work on version 1.0 of that business application because tables or table fields referenced in the database content may not be available in the earlier version.

Figure 2:
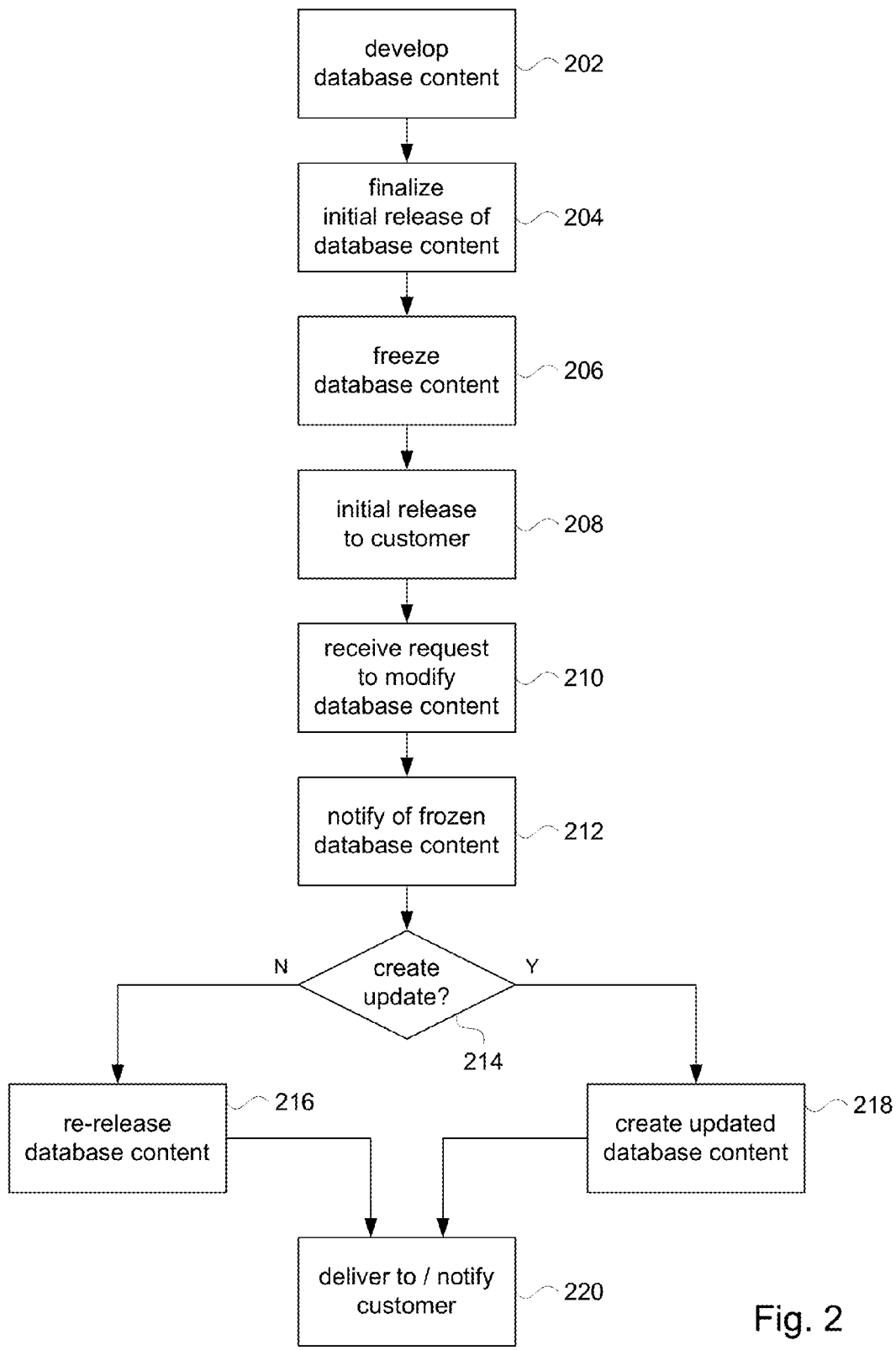
FIG. 2 illustrates a workflow in the provider system shown in FIG. 1.

Referring now to FIG. 2, in some embodiments, the release manager 122 may participate in a workflow relating to releases of database content, including the initial release and subsequent updates. Thus, in a step 202, developers in the provider system 102 may develop new database content for a customer; e.g., a newly developed data model for the customer's ERP system. At some point, the database content will be deemed ready to ship. Accordingly, at a step 204, the developers may finalize the database content and create an "initial release" of the database content. In a step 206, the release manager 122 may be notified of the initial release and mark the initial release of the database content to be "frozen." For example, a group leader of the development effort may designate the initial release as frozen. In a step 208, the initial release may be delivered to a customer system 104.

At some time after the "freeze", there may be a need to modify the initial release of the database content. For example, the developer may want fix a bug in the data model, or the customer may have requested a feature, etc. In accordance with the present disclosure, in a step 210, a developer may consult the release manager 122 to determine the current state of the database content. In a step 212, the developer may be informed that the database content they want to modify is frozen. In a step 214, exception processing may be initiated to determine whether the modification(s) to the frozen database content is sufficiently significant as to warrant an update of the frozen database content, or whether the frozen database content can be re-released. For example, "minor" changes such as changes in the description, administration attributes, tags to facilitate finding a view, and the like may not warrant an update type of release of the database content, but rather a re-release of the database content. In some embodiments, a re-release of database content is functionally identical to a previously released version from the consumer's point of view in terms of schemas and data tables that are referenced, fields and field attributes, data views, and so on. In such a case, the database content may be re-released in a step 216. The re-released database content may then be delivered to the customer in a step 220, or the customer may be otherwise notified of the re-released database content.

If, on the other hand, the changes are not minor, then an update of the database content may be created in a step 218. For example, if a constituent data object in the database content has been modified, or if a completely new data object has been added to the database content, then an updated database content package may be created. In accordance with the present disclosure, the updated database content comprises only changes ("deltas") made to the previous database content. As explained above, the changes may be a change to an existing data object or a newly created data object. In either case, a "new" data object is created. Updated database content may comprise one or many such new data objects. In a step 220, the updated database content may then be delivered or otherwise notified to the customer.

Figure 3:
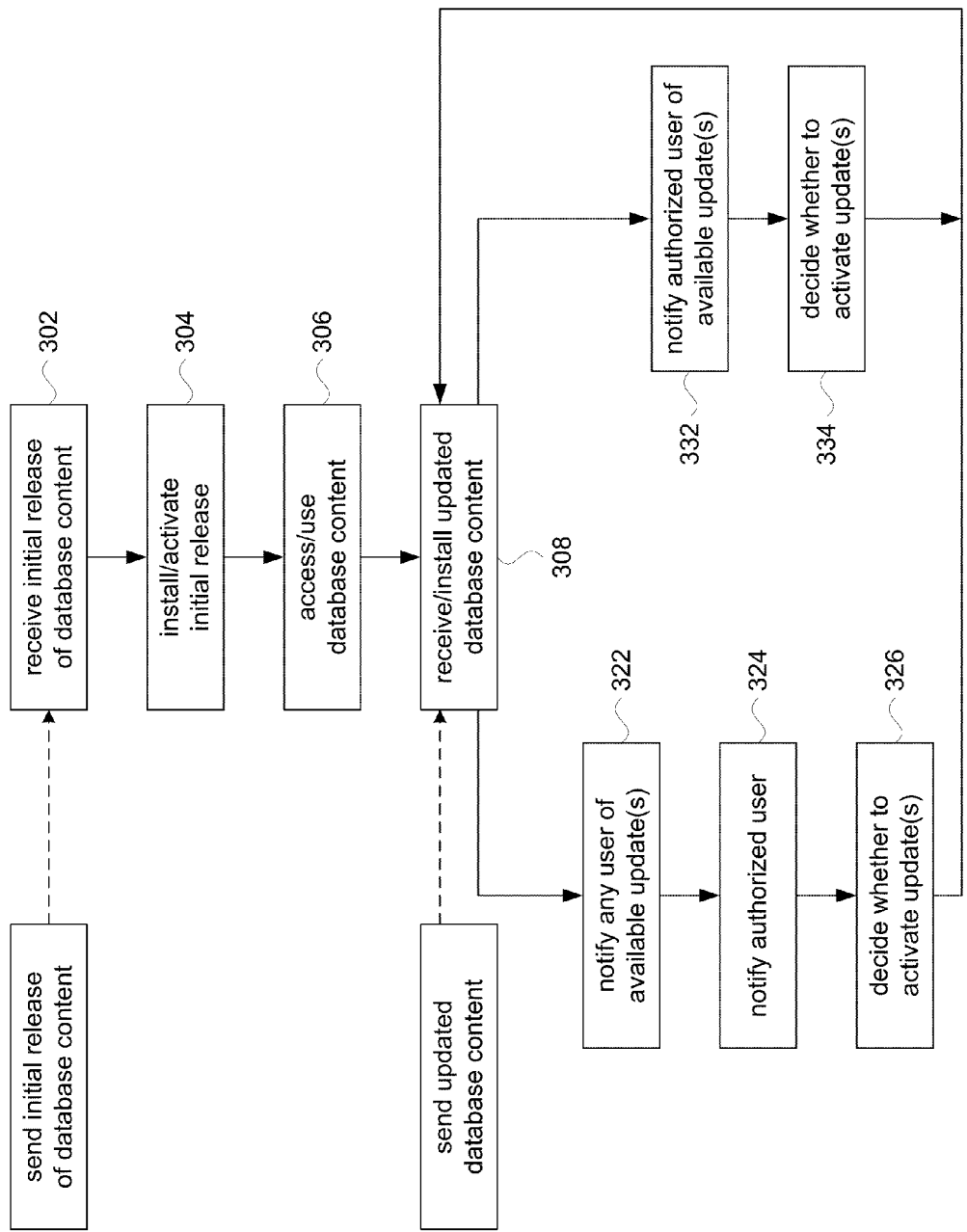
FIG. 3 illustrates a workflow in the customer system shown in FIG. 1.

Referring now to FIG. 3, processing of received database content in the customer system 104 in accordance with some embodiments will now be discussed. For example, when the provider system 102 sends an initial release of the database content (e.g., step 208), the customer system 104 may receive the initial release in step 302. In a step 304, a user in the customer system 104 (e.g., administrative user in an information technology (IT) support group) may install the received initial release of the database content on the customer system 104. As used herein, "install" refers to simply loading the initial release of the database content onto the customer system 104; e.g., copying files over from an installation disk. Once installed, however, the database content (e.g., data model) may need to be "activated" in order to be accessed, in a step 306, by consumers in the customer system 104; e.g., sales manager, production manager, business expert, etc. For example, activation of an installed initial release of database content may include generating runtime objects (e.g., for generating data views) from modeling information contained in the database content. Activation of an installed initial release of database content may involve configuring login information for users, defining access permissions, initial loading of data tables, and so on.

At some later time, the provider system 102 may send an update of the database content to the customer system 104 (e.g., step 220). When the customer system 104 receives the updated database content, e.g., in step 308, an administrator of the customer system may install the received updated database content. In accordance with principles of the present disclosure, however, the installed updated database content is not immediately available (activated) for consumption. In this context, "activation" will refer to actually replacing pre-existing data objects which are currently in use with corresponding new data objects from the updated database content, generating entirely new runtime objects, generating new runtime objects to replace existing runtime objects, and so on. Some runtime objects may have associated data views. Accordingly, generating new runtime objects which replace old runtime object may result in old data views being replaced by new data views. Since activation of the updated database content may cause disruption to some operations in the business (e.g., replacement of an old data view with a new data view without the user realizing it), not just any user is given authorization to activate the installed updated database content. For example, the administrator who installed the updated database content may not have sufficient authority. A user who has "read only" access to the database content, for example to perform analytics or to print out a report, may not have sufficient authority. Instead, only certain users may be authorized to activate installed updated database content. For example, a group leader, a manager, business expert, report creator, and the like may be have authority to activate the installed updated database content.

The authorized user may be notified of the updated database content. Notification may be provided to an authorized user in any of several ways. For example, in a step 322, any user (authorized or not) accessing previously installed and activated database content may be notified of the presence of the installed updated database content, but is not otherwise allowed to activate the updated database content.

In a step 324, the user may then contact an authorized user of the notification. For example, if the user is notified in an email, the user may forward the email to the authorized user. In some embodiments, the notification may include descriptive information about the updated database content. For example, if the updated database content includes data objects that have been newly added to the database content, the notification may include a description of new features or new objects provided in the updated database content; e.g., new views, new analyses, and the like. If the updated database content includes existing data objects that have been modified, the notification may indicate that fact and identify the existing previously installed data objects that have been modified, what the modifications are, what other objects are affected, and so on.

In a step 326, the authorized user may decide, based on information provided in the notification, to activate the updated database content. In some embodiments, activation of updated database content may include replacing old data objects with corresponding new data objects contained in the updated database content package; e.g., replacing old views in an already installed data model with new views from an updated data model. For example, activation of updated database content may include generating new runtime objects (e.g., for generating data views) from modeling information contained in the updated database content, which replace the old runtime objects. Accordingly, old data views generated by the old runtime objects will be replaced with new data views generated by the new runtime objects. Activation of updated database content may include modifying data in data tables (e.g., reformatting of data), and so on.

Returning to step 308, in other embodiments, after an updated database content package is received and installed, notification may be made directly to authorized users, as in step 332. For example, emails may be sent out to authorized users informing them of the availability of the installed updated database content. In some embodiments, several updates to the database content may be installed and available for activation. Once notified, the authorized user may decide, in a step 334, to activate the installed updated database content. As explained above, the notification may include descriptive material about the updated database content, allowing the authorized user to make an informed decision whether or not to activate the updated database content.

Figure 4:
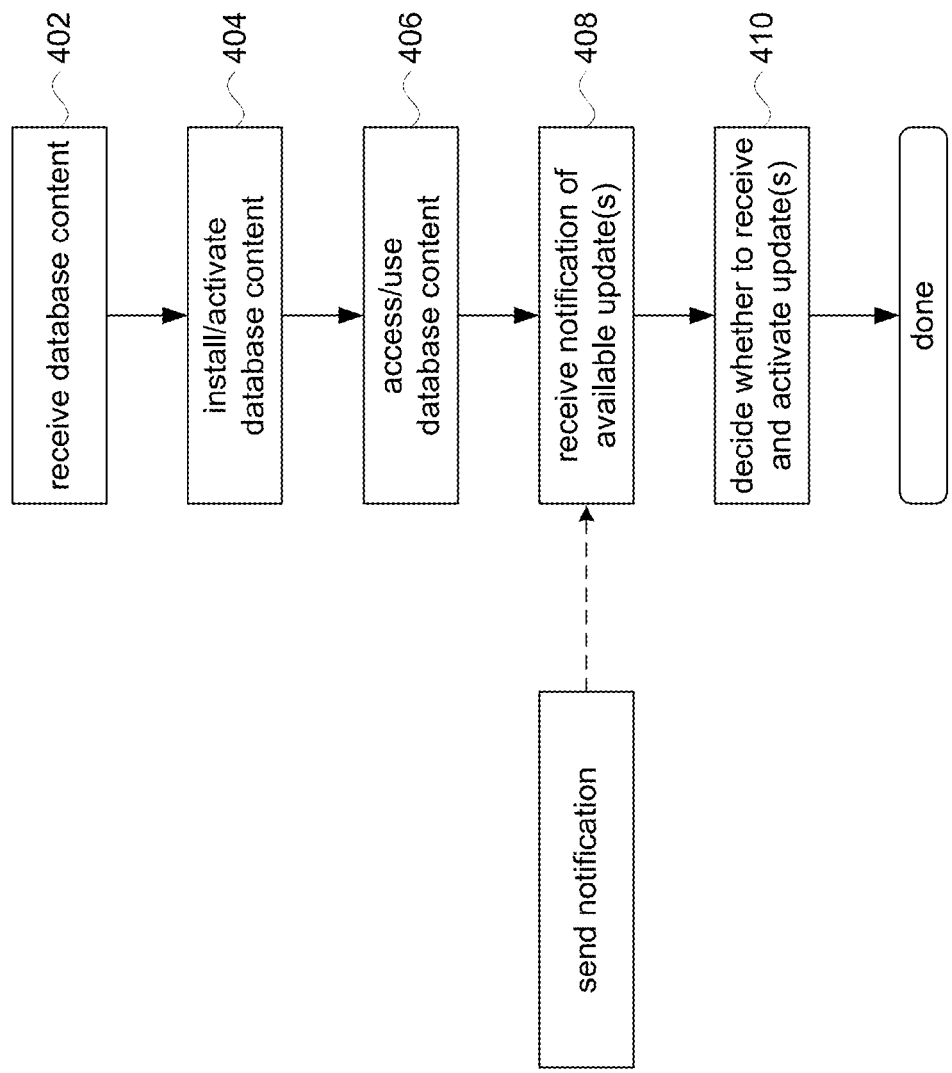
FIG. 4 illustrates another workflow in the customer system.

FIG. 4 shows another usage scenario, illustrating other embodiments of how the customer system 104 may receive updated database content from the provider system 102. Step 402 represents the customer system 104 receiving database content which, for example, may be an initial release of the database content. In a step 404, an administrative user on the customer side may install and activate the received database content for subsequent consumption by users (step 406).

In some embodiments, when the provider develops an update to the database content, the provider system 102 may send (e.g., step 220) a notification (e.g., email) of the availability of the updated database content to an authorized user in the customer system 104, rather than delivering the updated database content first and then notifying a user, as depicted in the workflow of FIG. 3. For example, the updated database content may be made available for downloading on a user support website hosted by the provider system 102 (e.g., SAP® Service Marketplace). Customers who have registered with the user support website may request to receive notifications of updated database content, for example, at their email address, or in a text message, on their Twitter® account, Facebook® account, and so on. Thus, in a step 408, the customer system 104 may receive a notification or otherwise learn of the updated database content along with information describing the updates provided in the updated database content.

In a step 410, the authorized user may decide whether or not to receive the notified updated database content and activate it. As explained above, the notification may include descriptive material about the updated database content, allowing the authorized user to make an informed decision whether or not to receive and activate the updated database content. For example, if the updated database content includes data objects that have been newly added to the database content, the notification may include a description of new features or new objects provided in the updated database content; e.g., new views, new analyses, and the like. If the updated database content includes existing data objects that have been modified, the notification may indicate that fact and identify the existing previously installed data objects that have been modified, what the modifications are, what other objects are affected, and so on. If the authorized user wishes to install and activate the updated database content, they may receive the updated database content from the user support website and proceed to install and activate the updated database content. For example, the user may download the updated database content to the customer system 104.

After the updated database content is activated (e.g., in step 326 or 334, or step 410), the workflow may proceed to step 308 (or 408) where another updated database content may be received, and the subsequent workflow is repeated. When subsequent updated database content is received and activated, the subsequent updates may be performed on the most recent previous update to the database content. In this way, installed database content can be incrementally updated over a period of time. Each incremental update may be kept small so as to minimize any impact on the customer system 104 that may result from any given update.

In accordance with the present disclosure, when an installed updated database content package in the customer system 104 is activated, existing data objects that have been replaced with updated versions of the existing data objects may be marked as "deprecated" to inform users that the data objects have been replaced. The user may then know not to use such data objects, or that continued use may result in unreliable output, and so on. In some embodiments, deprecation status levels may be defined:

deprecation, correction: The data object may include a link to a note that describes the error. This deprecation level may be used to indicate that continued use of the data object might result in errors.

deprecation, functional change: This deprecation level may be used to notify the user that functional extensions are available in the updated data object. The user may be informed that, after a period of time, the old data object may no longer be available.

deprecation, "hygienic" reasons: This deprecation level may signify that the old data object is still correct and functional, but will no longer be used in subsequent releases of the database content. After a period of time, the old data object may no longer be supported.

It will be appreciated that additional deprecation levels may be defined.

Another aspect of the present disclosure relates to versioning of releases of database content. For example, after an initial release of database content, the provider may develop subsequent versions of the database content (e.g., to offer additional capability or content). In accordance with principles of the present disclosure, the initial release and subsequent versions of database content may be offered to customers as "shipping variants," including full installation variants and delta installation variants. As mentioned earlier, it may be desirable to ship only deltas of a full installation rather than the full installation, where only new data objects or changed data objects in the database content are delivered.

Releases of database content may be delivered as full installations or as delta installations. In accordance with the present disclosure, activation of a full installation release would completely replace a previously installed and activated database content with updated database content. Activation of a delta installation release would replace only portions of a previously installed and activated database content.

Figure 5:
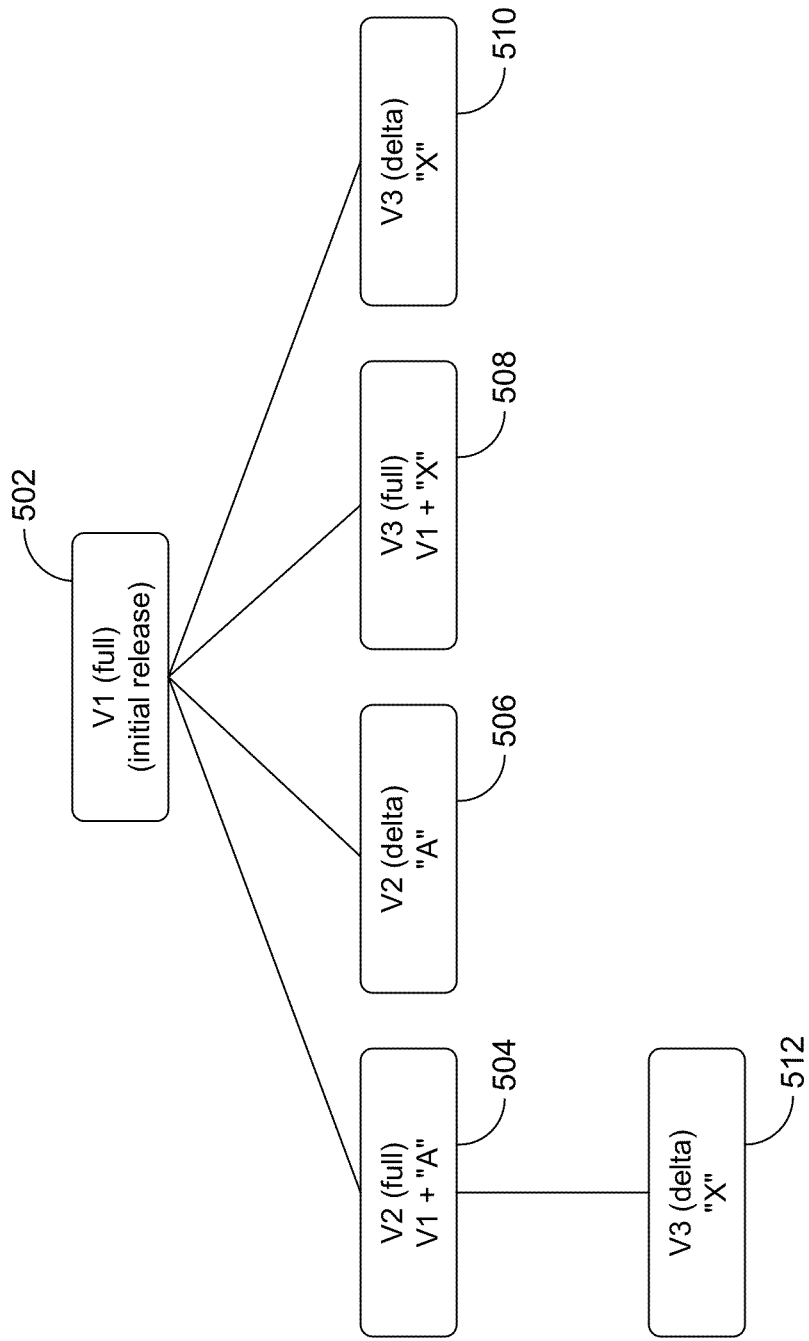
FIG. 5 shows typical examples of database content versioning in accordance with the present disclosure.

Referring to FIG. 5, an illustrative example of a family of releases of database content is shown. For example, version V1 database content may be an initial release of database content. Accordingly, version V1 database content may be delivered as a full installation package 502. Suppose a feature "A" is developed and added to version V1. The feature "A" may be delivered as version V2 database content in a full installation package 504. Alternatively, the feature "A" may be delivered as a delta installation package 506, including identifying that the delta installation package is based on the version V1 database content. Another feature "X", separate from feature "A", may be developed. Feature "X" may likewise be added to the version V1 database content and delivered as a full installation package 508 or as a delta installation package 510.

FIG. 5 illustrates an example of stacking variants. For example, feature "X" can be added to the version V2 database content which, when installed, may update the initial release of database content to include features "A" and "X". Accordingly, a delta installation package 512 comprising feature "X" may be delivered to a customer system that has version V2 database content (either via a full installation 504, or by upgrading the initial release 502 with a delta installation 506). The delta installation package 512 may designate that the base version of the upgrade is the version V2 database content. It will be appreciated that installation details and activation details of the delta installation package 512 may differ from those of the delta installation package 510 because of their different respective installation base versions.

Figure 6:
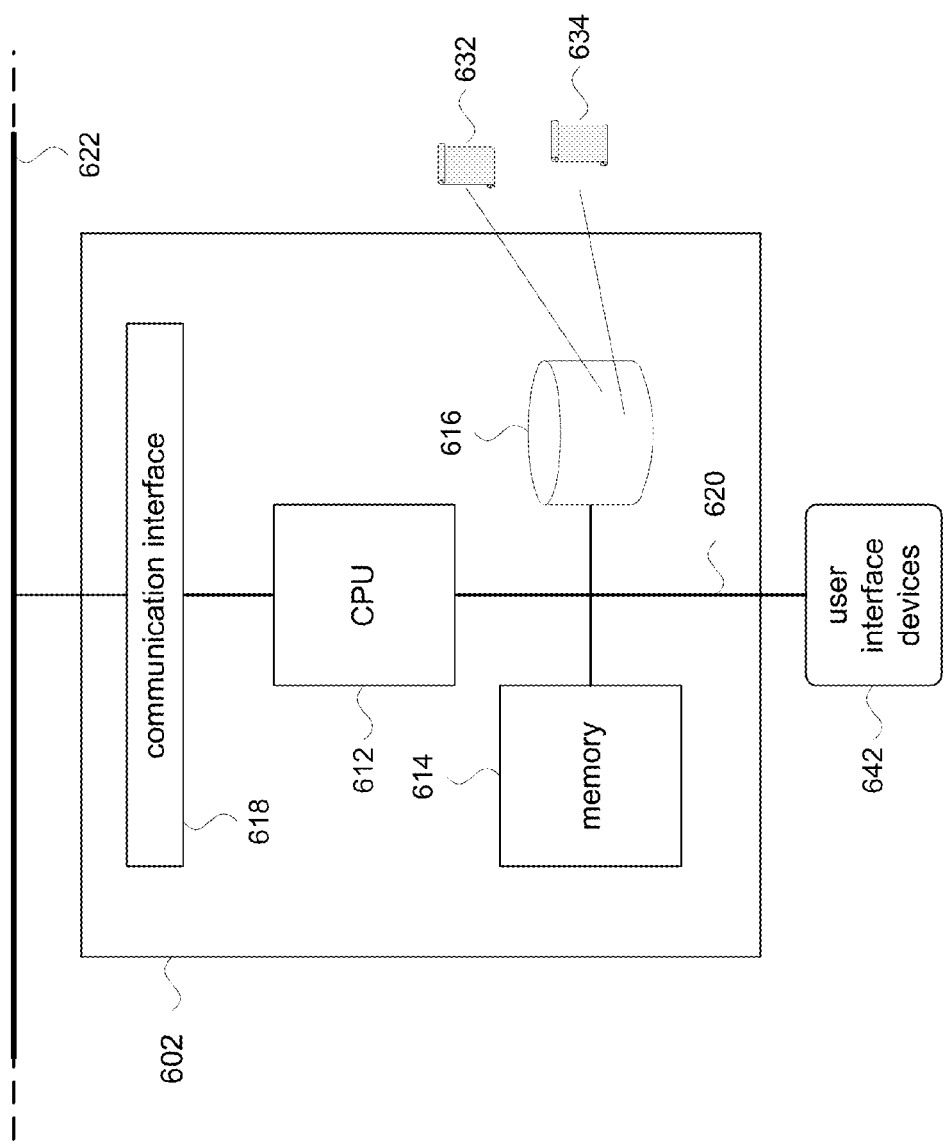
FIG. 6 illustrates an example of a computer system according to the present disclosure.

A particular embodiment of the provider system 102 in accordance with the present disclosure is illustrated in FIG. 6, showing a high level block diagram of a computer system 602 configured to operate in accordance with the present disclosure. The computer system 602 may include one or several central processing units (CPUs) or some other similar system of data processing components. The computer system 602 may include various memory components. For example, the memory components may include a volatile memory 614 (e.g., random access memory, RAM) and a data storage device 616. A communication interface 618 may be provided to allow the computer system 602 to communicate over a communication network 622, such as a local area network (LAN), the Internet, and so on. An internal bus 620 may interconnect the components comprising the computer system 602.

The data storage device 616 may comprise a non-transitory computer readable medium having stored thereon computer executable program code 632. The computer executable program code 632 may be executed by the CPU 612 to cause the CPU to perform steps of the present disclosure, for example the steps set forth in FIG. 2. The data storage device 616 may store data structures 634 such as object instance data, runtime objects, and any other data described herein.

A user may interact with the computer system 602 using suitable user interface devices 642. They may include, for example, input devices such as a keyboard, a keypad, a mouse or other pointing device, and output devices such as a display.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. It will be appreciated that embodiments are not limited to any specific combination of hardware and software. Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Advantages and Technical Effect

With the foregoing method and system for database content provisioning and delivery, the updating of database content becomes as easy as possible for customers. Content installation can occur in a non-disruptive manner. For example, only newly created data objects may be installed and activated, or only changes to existing data objects that are compatible may be installed and activated. Accordingly, minimal to no adjustment effort and minimal to no regression testing of existing scenarios are likely to be needed. Additionally, the delivery enables new offerings on a regular basis with installation variants such as delta installations and full installations. This gives customers additional flexibility regarding the time of adaptation of new database content versions, resulting all in all in low total cost of operating (TCO) and likely a high adaptation rate of the database content. The separation in base version and incremental content update packages ensures that the whole database content has to be implemented, shipped and maintained only once which ensures additionally a low TCO.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

What is claimed is:

1. A method for providing database content comprising operating a computer system to perform steps of:
receiving an initial release of database content at a receiving computer system;
installing the initial release of database content on the receiving computer system;
activating the installed database content as initial database content, thereby allowing users on the receiving computer system to use the initial database content, the initial database content comprising a plurality of data tables, a plurality of data models, and a plurality of runtime objects;
receiving at the receiving system updated database content from a supplier of the initial release of database content, the updated database content comprising one or more new data tables, new data models, or new runtime objects, wherein the updated database content further comprises new data objects that are modifications of existing data objects;
installing the updated database content on the receiving system without affecting the data tables, data models, and runtime objects of the initial database content, wherein users continue to access only the data tables, data models, and runtime objects of the initial database content;
subsequent to the installing, activating the updated database content on the receiving system by a first user who is authorized to update the initial database content including adding the new data tables, new data models, or new runtime objects to the initial database content or replacing data tables, data models, or runtime objects of the initial database content with the new data tables, new data models, or new runtime objects, wherein users can access the updated database content subsequent to the activating; and
notifying the first user of availability of the updated database content including informing the first user that the new data objects comprise modifications of existing data objects, and identifying another data object affected by the modifications of existing data objects.

2. The method of claim 1 further comprising installing the updated database content on the receiving system prior to the step of notifying.

3. The method of claim 1 further comprising notifying any user of availability of the updated database content when said any user accesses the initial database content to use it, wherein said any user notifies the first user of the updated database content.

4. The method of claim 1 further comprising notifying the first user of availability of the updated database content prior to the step of receiving.

5. The method of claim 4 wherein the receiving comprises the first user downloading the updated database content from a sending computer system.

6. The method of claim 1 wherein the updated database content is a delta installation comprising only the one or more new data objects.

7. The method of claim 1 wherein the updated database content is a full installation, wherein when the full installation is activated, the initial database content is entirely replaced by data comprising the full installation.

8. A database system comprising:
a computer system;
a data storage system having stored thereon a database;
computer executable program code which, when executed by the computer system, causes the computer system to:
receive an initial release of database content at a receiving computer system;
install the initial release of database content on the receiving computer system;
activate the installed database content, thereby allowing users on the receiving computer system to use the activated database content, the initial database content comprising a plurality of data tables, a plurality of data models, and a plurality of runtime objects, wherein the updated database content further comprises new data objects that are modifications of existing data objects;
receive updated database content at the receiving system from a supplier of the initial release of database content, the updated database content comprising new data tables, new data models, or new runtime objects;
install the updated database content on the receiving system without affecting the data tables, data models, and runtime objects of the initial database content, wherein users continue to access only the data tables, data models, and runtime objects of the initial database content;
subsequent to the install, activate the updated database content on the receiving system by a first user who is authorized to update the initial database content including adding the new data tables, new data models, or new runtime objects to the initial database content or replacing data tables, data models, or runtime objects of the initial database content with the new data tables, new data models, or new runtime objects, wherein users can access the updated database content subsequent to the activating; and
notify the first user of availability of the updated database content including informing the first user that the new data objects comprise modifications of existing data objects, and identifying another data object affected by the modifications of existing data objects.

9. The database system of claim 8 wherein the computer executable program code further causes the computer system to install the updated database content on the receiving system prior to notifying the first user.

10. The database system of claim 8 wherein the computer executable program code further causes the computer system to notify any user of availability of the updated database content when said any user accesses the activated database content to use it, wherein said any user notifies the first user of the updated database content.

11. The database system of claim 8 wherein the computer executable program code further causes the computer system to notify the first user of availability of the updated database content prior to receiving the updated database content.

12. The database system of claim 11 the wherein the computer executable program code further causes the computer system to download the updated database content from a sending computer system in response to input from the first user, thereby receiving the updated database content.

13. A non-transitory computer readable storage medium having stored thereon executable program code configured to cause a computer to perform steps of:
   receiving an initial release of database content at a receiving computer system;
   installing the initial release of database content on the receiving computer system;
   activating the installed database content as initial database content, thereby allowing users on the receiving computer system to use the initial database content, the initial database content comprising a plurality of data tables, a plurality of data models, and a plurality of runtime objects;
   receiving at the receiving system updated database content from a supplier of the initial release of database content, the updated database content comprising one or more new data tables, new data models, or new runtime objects, wherein the updated database content further comprises new data objects that are modifications of existing data objects;
   installing the updated database content on the receiving system without affecting the data tables, data models, and runtime objects of the initial database content, wherein users continue to access only the data tables, data models, and runtime objects of the initial database content;
   subsequent to the installing, activating the updated database content on the receiving system by a first user who is authorized to update the initial database content including adding the new data tables, new data models, or new runtime objects to the initial database content or replacing data tables, data models, or runtime objects of the initial database content with the new data tables, new data models, or new runtime objects, wherein users can access the updated database content subsequent to the activating
   notifying the first user of availability of the updated database content including informing the first user that the new data objects comprise modifications of existing data objects, and identifying another data object affected by the modifications of existing data objects.

14. The non-transitory computer readable storage medium of claim 13 wherein the executable program code further causes the computer system to install the updated database content on the receiving system prior to notifying the first user.

15. The non-transitory computer readable storage medium of claim 13 wherein the executable program code further causes the computer system to notify any user of availability of the updated database content when said any user accesses the activated database content to use it, wherein said any user notifies the first user of the updated database content.

16. The non-transitory computer readable storage medium of claim 13 wherein the executable program code further causes the computer system to notify the first user of availability of the updated database content prior to receiving the updated database content.

\* \* \* \* \*